United States Patent
Griebel et al.

(10) Patent No.: US 12,102,093 B2
(45) Date of Patent: Oct. 1, 2024

(54) FLAVORED FLATBREAD

(71) Applicant: Cargill, Incorporated, Wayzata, MN (US)

(72) Inventors: Jonathan Mark Griebel, Maple Grove, MN (US); Paraluman B. Guillermo, Maple Grove, MN (US); Olivia Rose Vogt, Plymouth, MN (US)

(73) Assignee: CARGILL, INCORPORATED, Wayzata, MN (US)

( * ) Notice: Subject to any disclaimer, the term of this patent is extended or adjusted under 35 U.S.C. 154(b) by 747 days.

(21) Appl. No.: 17/253,510

(22) PCT Filed: Jun. 5, 2019

(86) PCT No.: PCT/US2019/035605
§ 371 (c)(1),
(2) Date: Dec. 17, 2020

(87) PCT Pub. No.: WO2019/245739
PCT Pub. Date: Dec. 26, 2019

(65) Prior Publication Data
US 2021/0251246 A1    Aug. 19, 2021

Related U.S. Application Data

(60) Provisional application No. 62/686,830, filed on Jun. 19, 2018.

(51) Int. Cl.
*A21D 13/28* (2017.01)
*A21D 13/24* (2017.01)
(Continued)

(52) U.S. Cl.
CPC ............. *A21D 13/28* (2017.01); *A21D 13/24* (2017.01); *A21D 13/41* (2017.01); *A21D 13/42* (2017.01); *A21D 13/43* (2017.01)

(58) Field of Classification Search
CPC .......... A21D 13/43; A21D 13/22; A21D 13/28
See application file for complete search history.

(56) References Cited

U.S. PATENT DOCUMENTS

| 4,574,090 A | 3/1986 | Paulucci |
| 6,267,998 B1 | 7/2001 | Bauman |

(Continued)

FOREIGN PATENT DOCUMENTS

| CN | 107467124 A | 12/2017 |
| CN | 104957215 B | 7/2018 |

(Continued)

OTHER PUBLICATIONS

"Flatbread French Toast—Breakfast Ideas—Flatout Bread". Available on You Tube as of Apr. 26, 2016, pp. 1-7 of transcript of text and video images. (Year: 2016).*
"Skillet Flatbread", available online as of Jun. 15, 2016 from http://jernejkitchen.com. pp. 1-12. (Year: 2016).*
"French Toast Recipe", available online as of Mar. 11, 2015 from http://iheartrecipes.com. pp. 1-7. (Year: 2015).*

(Continued)

*Primary Examiner* — Jenna A Watts

(57) ABSTRACT

Flavored flatbread is made by a method comprising providing a cooked flatbread having first and second major surfaces and a thickness of from about 1.0 to about 10 mm and a density of from about 0.1 to about 0.5 g per cubic cm and docking the cooked flatbread to impart a plurality of holes into at least the first major surface of the cooked flatbread. An egg containing liquid mixture is applied to the docked cooked flatbread in an amount and time sufficient to take up from about 0.02 to about 0.09 g per square cm linear surface area of the docked cooked flatbread to provide a coated flatbread. The coated flatbread is cooked to provide a cooked flavored flatbread. Flavored flatbreads are also described.

17 Claims, 4 Drawing Sheets

(51) Int. Cl.
  *A21D 13/41* (2017.01)
  *A21D 13/42* (2017.01)
  *A21D 13/43* (2017.01)

(56) References Cited

U.S. PATENT DOCUMENTS

2004/0071832 A1  4/2004  Stevens
2014/0342051 A1  11/2014  Rendon

FOREIGN PATENT DOCUMENTS

| DE | 4423997 C2 | 4/1997 | | |
|---|---|---|---|---|
| JP | H10108615 A | 4/1998 | | |
| JP | 2016220640 A | * | 12/2016 | ............ A21D 13/00 |
| WO | 2007098437 A2 | 8/2007 | | |

OTHER PUBLICATIONS

"Coconut Poke Cake", available online as of Mar. 30, 2015 from BitznGiggles.com. pp. 1-12. (Year: 2015).*

"Ideas in Food—Injecting Flavor, the Potential". Available online as of Aug. 23, 2014 from blog.ideasinfood.com. pp. 1-3/ (Year: 2014).*

JP2016-220640 machine translation, publication date Dec. 28, 2016. pp. 1-10. (Year: 2016).*

Travel, et al. "Effect of hen age, moult, laying environment, and egg storage on egg quality". Improving the safety and quality of egg and egg products: Egg chemistry, Production and Consumption, 2011. pp. 1-13. (Year: 2011).*

"Grams to cups—3 cups milk in grams". Available as of 2023 from https://gramstocups.net. pp. 1-10. (Year: 2023).*

* cited by examiner

"VALUE" MIX

"VALUE" MIX

FLAVORED FLATBREAD

CROSS REFERENCE TO RELATED APPLICATIONS

This application is a national phase application of PCT/US2019/035605, filed 5 Jun. 2019, entitled FLAVORED FLATBREAD, which claims the benefit of priority to U.S. Provisional Application No. 62/686,830, filed 19 Jun. 2018, entitled FLAVORED FLATBREAD, which are hereby incorporated by reference in their entirety.

FIELD

The present invention relates to systems for bread products.

BACKGROUND

Japanese Patent application publication number JP 10108615 describes mass-production of egg liquid infiltrated food by speedily infiltrating seasoning liquid such as egg liquid having high viscosity into porous food. The Abstract of this publication indicates that the egg liquid can be infiltrated into the porous food stored in the housing part by shifting the porous food circumstance from under vacuum to under atmospheric pressure.

SUMMARY

If one attempts to prepare a French toast-type product using flatbread, insufficient egg composition is taken up to provide a suitable food product because of flatbread's high crust to crumb ratio and limited crumb.

It has been found that a unique food product that is similar to French toast, but with unique texture and flavor characteristics can be prepared by providing a cooked flatbread having a thickness of from about 1.0 to about 10 mm and a density of from about 0.1 to about 0.5 g/cm³ and docking the cooked flatbread to impart a plurality of holes into at least one side of the cooked flatbread. After docking, egg containing liquid mixture is applied to the docked cooked flatbread in an amount and time sufficient to take up from about 0.02 to about 0.09 g per cm² linear surface area of the docked cooked flatbread to provide a coated flatbread. The thus coated flatbread is cooked to provide a flavored flatbread.

The products prepared by this process exhibit a surprising increase in delivery of flavor as compared to flatbreads treated with a like egg mix without docking.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION

Figure 1:
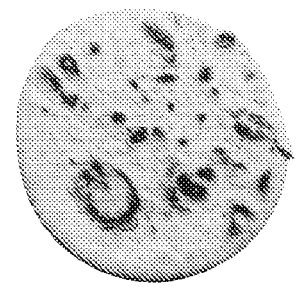
FIG. 1 is a top view photograph of the front side of a cooked flatbread prior to docking.
Figure 2:
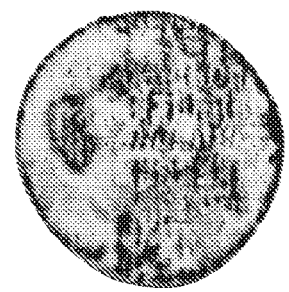
FIG. 2 is a top view photograph of the back side of a cooked flatbread prior to docking.
Figure 3:
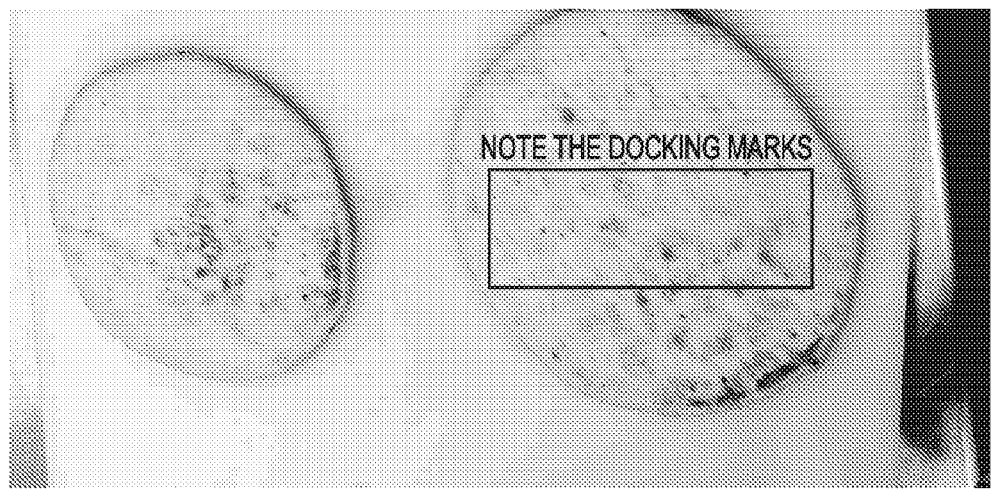
FIG. 3 is a top view photograph of docked cooked flatbreads with plain egg soak after baking. The docking marks are highlighted in the flatbread on the right.
Figure 4:
FIG. 4 is a top view photograph of docked cooked flatbreads with egg soak flavored with cinnamon after baking (i.e., a cooked cinnamon flavored flatbread).
Figure 5:
FIG. 5 is a top view photograph of docked cooked flatbreads with egg soak flavored with chocolate after baking (i.e., a cooked chocolate flavored flatbread).
Figure 6:
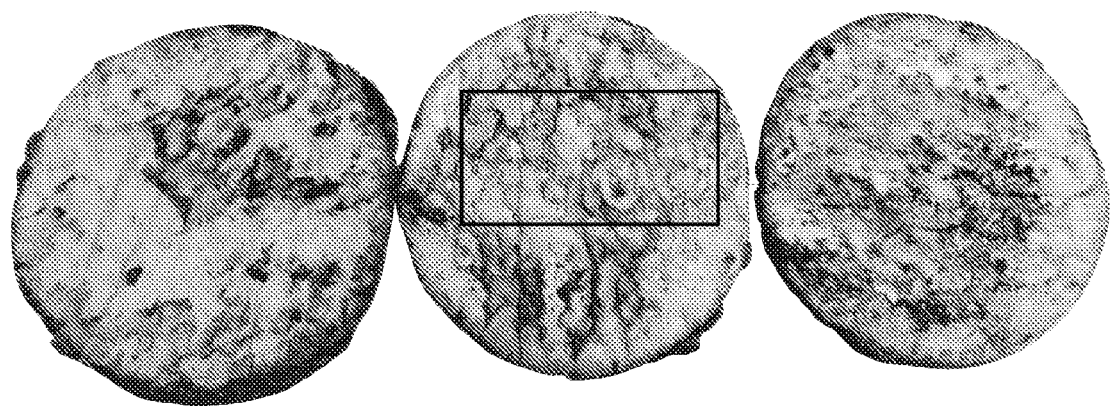
FIG. 6 is a top view photograph of docked cooked flatbreads with egg soak flavored with vanilla and cinnamon after baking (i.e., a cooked vanilla-cinnamon flavored flatbread) that were produced in a production plant. The docking marks are highlighted in the flatbread in the middle.

The aspects of the present invention described below are not intended to be exhaustive or to limit the invention to the precise forms disclosed in the following detailed description. Rather a purpose of the aspects chosen and described is by way of illustration or example, so that the appreciation and understanding by others skilled in the art of the general principles and practices of the present invention can be facilitated.

A flatbread is a bread made with flour, water and salt, and then thoroughly rolled into flattened dough of relatively thin dimension. The flatbread may be either unleavened or slightly leavened, such as pita bread, pizza crust, tortilla, roti, and chapati. Flatbreads suitable for use in the present method have a cooked thickness of from about 1.0 to about 10 mm and a density of from about 0.1 to about 0.5 g/cm³. In an aspect, the cooked flatbread has a thickness of from about 1.5 to about 8 mm, or has a thickness of from about 2 to about 6 mm. In an aspect, the cooked flatbread has a density of from about 0.2 to about 0.4, or has density of from about 0.25 to about 0.35.

In an aspect, the cooked flatbread has a width of from about 5 to about 40 cm and a length of from about 5 to about 40 cm. In an aspect, the cooked flatbread has a width of from about 8 to about 30 cm and a length of from about 8 to about 30 cm. In an aspect, the cooked flatbread has a width of from about 10 to about 20 cm and a length of from about 10 to about 20 cm. In an aspect, the cooked flatbread has a width of from 3 to 8 cm and a length of from about 10 to about 30 cm. In an aspect, the major surfaces of the cooked flatbread have a two dimensional shape that is selected from circular, oval, squared, rectangular, triangular, and polygonal.

The cooked flatbread is prepared by any suitable cooking process, such as baking, frying, deep frying, grilling, toasting and the like.

The cooked flatbread is then docked to impart a plurality of holes into at least one side of the cooked flatbread, i.e. at least the first major surface of the first and second major surfaces of the cooked flatbread. Conventionally, docking is used as a treatment of raw dough by poking holes into the dough to allow expanding gas and steam to escape during baking. In the present method, docking is instead carried out after the flatbread has been cooked, which changes the surface characteristics of the flatbread.

Docking may be carried out by any appropriate technique, such as by rolling the cooked flatbread using a roller provided with pins that radially extend from the roller. The pins may have any desired cross-section shape for imparting a like shaped hole in the cooked flatbread. In an aspect, the pins may have cross-section shape selected from circular, oval, triangular, rectangular (including square), polyhedral, or a combination of one or more such shapes.

In an aspect, after docking the cooked flatbread has a plurality of holes on at least one of the major surfaces of the cooked flatbread. In an aspect, after docking the cooked flatbread has a plurality of holes on both of the major surfaces of the cooked flatbread. In an aspect, after docking the cooked flatbread has an average hole density of about 30 to about 60, or has an average hole density of about 40 to about 50 holes per 25 cm² of the cooked flatbread.

In an aspect, an egg containing liquid mixture is applied to the docked cooked flatbread in an amount and time sufficient to take up from about 0.02 to about 0.09 g per cm² linear surface area of the docked cooked flatbread to provide a coated flatbread.

Application of the egg containing liquid mixture is carried out by any appropriate technique, such as by spraying the docked cooked flatbread with the egg containing liquid mixture or dipping the docked cooked flatbread with the egg containing liquid mixture.

In an aspect, the egg containing liquid mixture is a liquid having a viscosity of from about 6 to about 400 cps, or about 10 to about 200 cps at 15° C. and 33% dry solids, as measured by a Brookfield viscometer, spindle 1. In an aspect, the egg containing liquid mixture comprises ingredients to provide a sweet flavored composition. In an aspect, the egg containing liquid mixture comprises ingredients to provide a savory flavored composition. In an aspect, the egg containing liquid mixture comprises an ingredient selected from the group consisting of water, milk, dry milk, salt, sugar, and mixtures thereof. In an aspect, the egg containing liquid mixture comprises an ingredient selected from the group consisting of vanilla, maple flavor, cinnamon, bourbon, chipotle, pepper, brown sugar, chile powder, garlic powder, onion powder, pepper flakes, oregano, paprika, cumin, chocolate, cocoa, cheese, and mixtures thereof.

The coated flatbread is cooked to provide a flavored flatbread. In an aspect, the coated flatbread is cooked by baking. In an aspect, the coated flatbread is cooked by grilling. In an aspect, the coated flatbread is cooked by toasting. In an aspect, the coated flatbread is cooked by frying. In an aspect, the coated flatbread is cooked by deep frying. In an aspect, the coated flatbread is fried or deep-fried in oil, shortening, or lard.

EXAMPLES

Example 1—Docked Versus Undocked Cooked Flatbreads

Cooked flatbreads were obtained from Kronos having a thickness of 5.58 mm and a circumference of 6 inches. They were docked by using a fork where holes were pierced into the first and second major surfaces of the cooked flatbread. The docked cooked flatbreads contained an average hole density of about 7 holes per 25 cm² of the cooked flatbread.

Egg containing liquid mixtures, with and without flavors, were prepared according to the following formulations:

TABLE 1

| Egg Soak | |
|---|---|
| Ingredient | Wt % |
| Whole Egg | 43 |
| Water | 41 |

TABLE 1-continued

| Egg Soak | |
|---|---|
| Ingredient | Wt % |
| Sugar | 12 |
| Whole Dry Milk | 4 |
| Total | 100% |

TABLE 2

| Vanilla Cinnamon Egg Soak | |
|---|---|
| Ingredient | Wt % |
| Whole Egg | 41.5 |
| Water | 41.0 |
| Sugar | 12.0 |
| Whole Dry Milk | 4.0 |
| Vanilla | 0.5 |
| Cinnamon | 1.0 |
| Total | 100% |

TABLE 3

| Chocolate Egg Soak | |
|---|---|
| Ingredient | Wt % |
| Whole Egg | 40.0 |
| Water | 39.0 |
| Sugar | 12.0 |
| Whole Dry Milk | 4.0 |
| Cocoa | 5.0 |
| Total | 100% |

The docked cooked flatbread made by the procedure in Example 1 was dipped in the egg soak provided in Table 1 for about 25 seconds and the amount of egg soak pick-up was determined and then compared to the undocked cooked flatbread that was dipped in the egg soak for the same amount of time. The docked coated flatbread picked up an average of 25 grams of egg soak compared to 11 grams of egg soak for the undocked coated flatbread. Docking allows for greater pick-up of the egg soak.

The docked coated flatbread was then placed on a flat top (Taylor 2 Platen Electric Grill Model 32-23) and cooked by baking with the clam at 218° C. for about 35 to about 45 seconds.

Different flavors of egg soaks provided in Tables 2 and 3 were tested on docked cooked flatbreads that were made by the procedure in Example 1. The resulting cooked flavored flatbreads were more flavorful than the undocked cooked flavored flatbreads likely due to the former having picked up more of the flavored egg soaks. In addition, the cooked flavored flatbreads were more moist and tender.

Example 2—Production Flatbread

Cooked flatbreads having (1) a circumference of 5.75 inches, a weight of 46.8 grams, and a thickness of 1.8 mm; or (2) a circumference of 6 inches, a weight of 51.0 grams, and a thickness of 4.3 mm, were obtained from Kronos. Using a stainless steel docker, the cooked flatbreads were docked by running the docker over the cooked flatbreads one time, using downward force to pierce holes in the first major surface of the cooked flatbreads. The docked cooked flatbreads contained an average hole density of about 7 holes per 25 cm² of the cooked flatbread. The docked cooked flatbreads were placed onto a French toast batter machine conveyor and immersed into the vanilla soak and then the top of the flatbread was sprayed with more vanilla egg soak for 29 seconds at a belt speed set at 30 using the vanilla-cinnamon egg soak provided in Table 4. The resulting coated flatbreads were placed on the grill (Bereif Tetlon Belt Grill BUBRA 6/1000) where they were cooked with the top oven set at 227° C. and the bottom oven at 229° F. for 48 seconds at a belt speed set at 30.

TABLE 4

Vanilla-Cinnamon Egg Soak

| Ingredient | Wt % |
|---|---|
| Whole Egg | 40.0 |
| Water | 39.0 |
| Sugar | 12.0 |
| Whole Dry Milk | 4.0 |
| Cocoa | 5.0 |
| Total | 100% |

After grilling the coated flatbreads, a sample of the resulting cooked vanilla-cinnamon flavored flatbreads with a circumference of 5.75 inches weighed 54.1 grams, and a sample with a circumference of 6 inches weighed 51.0 grams. The 5.75 inch, cooked flavored flatbread picked up 7.3 grams of vanilla-cinnamon egg soak; the 6 inch cooked flavored flatbread picked up 7.4 grams of vanilla-cinnamon egg soak. The cooked vanilla-cinnamon flavored flatbreads were infused with cinnamon and vanilla flavor, with a moist texture and a cinnamon flecked appearance.

As used herein, the terms "about" or "approximately" mean within an acceptable range for the particular parameter specified as determined by one of ordinary skill in the art, which will depend in part on how the value is measured or determined, e.g., the limitations of the sample preparation and measurement system. Examples of such limitations include preparing the sample in a wet versus a dry environment, different instruments, variations in sample height, and differing requirements in signal-to-noise ratios. For example, "about" can mean greater or lesser than the value or range of values stated by 1/10 of the stated values, but is not intended to limit any value or range of values to only this broader definition. For instance, a concentration value of about 30% means a concentration between 27% and 33%. Each value or range of values preceded by the term "about" is also intended to encompass the embodiment of the stated absolute value or range of values. Alternatively, particularly with respect to biological systems or processes, the term can mean within an order of magnitude, preferably within 5-fold, and more preferably within 2-fold, of a value.

Throughout this specification and claims, unless the context requires otherwise, the word "comprise", and variations such as "comprises" and "comprising", will be understood to imply the inclusion of a stated integer or step or group of integers or steps but not the exclusion of any other integer or step or group of integer or step. When used herein "consisting of" excludes any element, step, or ingredient not specified in the claim element. When used herein, "consisting essentially of" does not exclude materials or steps that do not materially affect the basic and novel characteristics of the claim. In the present disclosure of various embodiments, any of the terms "comprising", "consisting essentially of" and "consisting of" used in the description of an embodiment may be replaced with either of the other two terms.

All patents, patent applications (including provisional applications), and publications cited herein are incorporated by reference as if individually incorporated for all purposes. Unless otherwise indicated, all parts and percentages are by weight and all molecular weights are weight average molecular weights. The foregoing detailed description has been given for clarity of understanding only. No unnecessary limitations are to be understood therefrom. The invention is not limited to the exact details shown and described, for variations obvious to one skilled in the art will be included within the invention defined by the claims.

What is claimed is:

1. A method for making a flavored flatbread comprising:
providing a cooked flatbread having first and second major surfaces and a thickness of from about 1 to about 10 mm and a density of from about 0.1 to about 0.5 g/cm³;
docking the cooked flatbread to impart a plurality of holes into at least the first major surface of the cooked flatbread;
applying an egg containing liquid mixture to the docked cooked flatbread in an amount and time sufficient to take up from about 0.02 to about 0.09 g per cm² linear surface area of the docked cooked flatbread to provide a coated flatbread; and
cooking the coated flatbread to provide a cooked flavored flatbread.

2. The method of claim 1, wherein the cooked flatbread has a thickness of from about 1.5 to about 8 mm.

3. The method of claim 1, wherein the cooked flatbread has density of from about 0.2 to about 0.4 g/cm³.

4. The method of claim 1, wherein the cooked flatbread has been docked to impart a plurality of holes into the first and second major surfaces of the cooked flatbread.

5. The method of claim 1, wherein the holes have a horizontal cross-section shape that is circular, triangular, rectangular, or polygonal.

6. The method of claim 1, wherein the docked cooked flatbread has an average hole density of about 30 to about 60 holes per 25 cm² of the cooked flatbread.

7. The method of claim 1, wherein the egg containing liquid mixture is a liquid having a viscosity of from about 6 to about 400 cps at 15° C. and 33% dry solids, as measured by a Brookfield viscometer, #1 spindle.

8. The method of claim 1, wherein the egg containing liquid mixture comprises at least 30% egg by weight.

9. The method of claim 1, wherein the egg of the egg containing liquid mixture is whole egg.

10. The method of claim 1, wherein the egg containing liquid mixture comprises ingredients to provide a sweet flavored composition or a savory flavored composition.

11. The method of claim 1, wherein the egg containing liquid mixture comprises an ingredient selected from the group consisting of water, milk, dry milk, salt, sugar, and mixtures thereof.

12. The method of claim 1, wherein the egg containing liquid mixture comprises an ingredient selected from the group consisting of vanilla, maple flavor, cinnamon, bourbon, chipotle, pepper, brown sugar, chile powder, garlic powder, onion powder, pepper flakes, oregano, paprika, cumin, chocolate, cocoa, cheese, and mixtures thereof.

13. The method of claim 1, wherein the egg containing liquid mixture is applied to the docked cooked flatbread in an amount and time sufficient to take up from about 0.01 to about 0.07 g per cm² linear surface area of the docked cooked flatbread.

14. The method of claim 1, wherein the coated flatbread is cooked by baking, frying, deep frying, grilling, or toasting.

15. A cooked flavored flatbread made by the method of claim 1.

16. The method of claim 1, wherein the cooked flatbread has a thickness of from about 2 to about 6 mm.

17. The method of claim 1, wherein the docked cooked flatbread has an average hole density of about 40 to about 50 holes per 25 cm² of the cooked flatbread.

* * * * *